United States Patent [19]

Benz et al.

[11] Patent Number: 4,747,477
[45] Date of Patent: May 31, 1988

[54] ROLLER DECK LIFTING DEVICE FOR ANGULARLY DEFLECTING TRANSPORT GOODS

[75] Inventors: Hermann Benz; Reinhold Walz, both of Darmstadt, Fed. Rep. of Germany

[73] Assignee: Carl Schenck, Ag, Fed. Rep. of Germany

[21] Appl. No.: 871,383

[22] Filed: Jun. 6, 1986

[30] Foreign Application Priority Data

Aug. 31, 1985 [EP] European Pat. Off. ...... 85 111 002.3

[51] Int. Cl.$^4$ .............................................. B65G 13/00
[52] U.S. Cl. ................... 193/35 SS; 198/367; 198/372
[58] Field of Search ............. 193/35 SS, 36; 198/367, 198/372, 782, 955

[56] References Cited

U.S. PATENT DOCUMENTS

| | | | |
|---|---|---|---|
| 3,011,665 | 12/1961 | Wise | 193/35 SS |
| 3,265,186 | 8/1966 | Burton | 193/35 SS |
| 4,627,526 | 12/1986 | Masciarelli | 193/35 SS |

FOREIGN PATENT DOCUMENTS

| | | | |
|---|---|---|---|
| 2520294 | 11/1976 | Fed. Rep. of Germany | 198/367 |
| 655624 | 4/1979 | U.S.S.R. | 198/372 |

Primary Examiner—Joseph F. Peter, Jr.
Assistant Examiner—James M. Kannofsky
Attorney, Agent, or Firm—Connolly and Hutz

[57] ABSTRACT

A roller deck for the angular deflection of a pallet comprises a basic frame and a lift frame which is movable relative to the basic frame. Both frames have rollers for supporting a pallet. A pneumatic lifting device between the frames elevates the lifting frame upon activation. With such pneumatic lifting, replacement of damaged lifting elements is accomplished without separating the basic frame and lift frame. Moreover, such lift elements are maintenance free during operation.

7 Claims, 2 Drawing Sheets

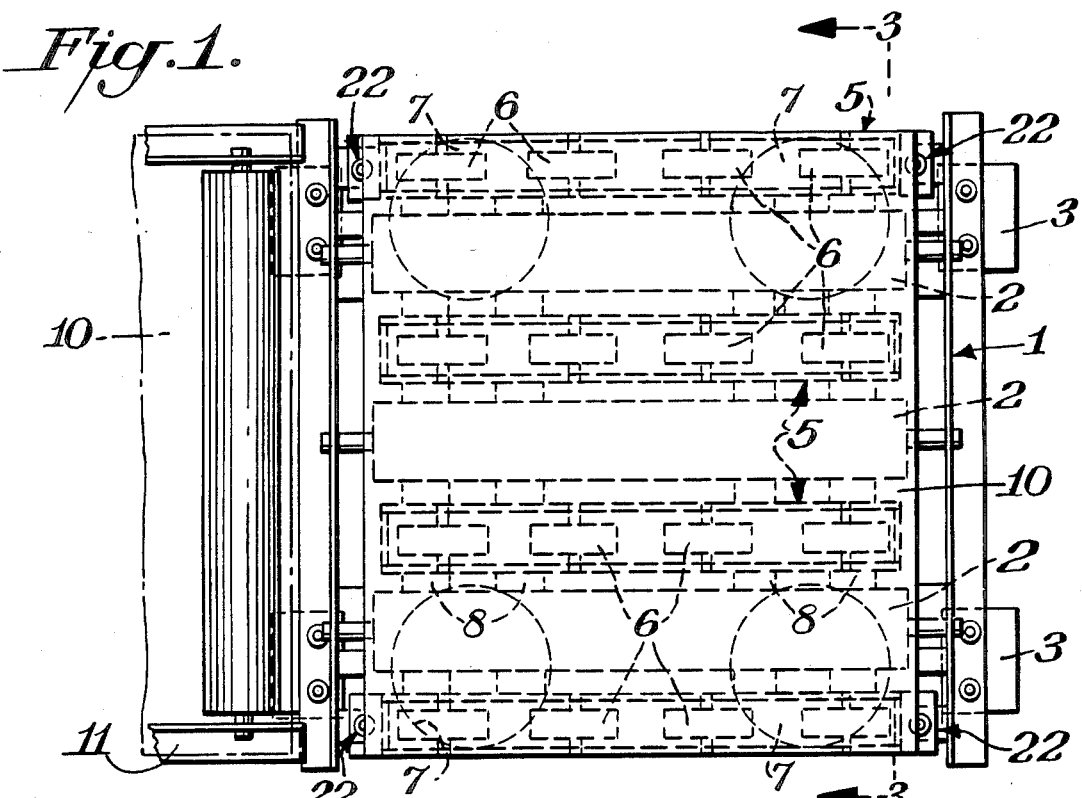
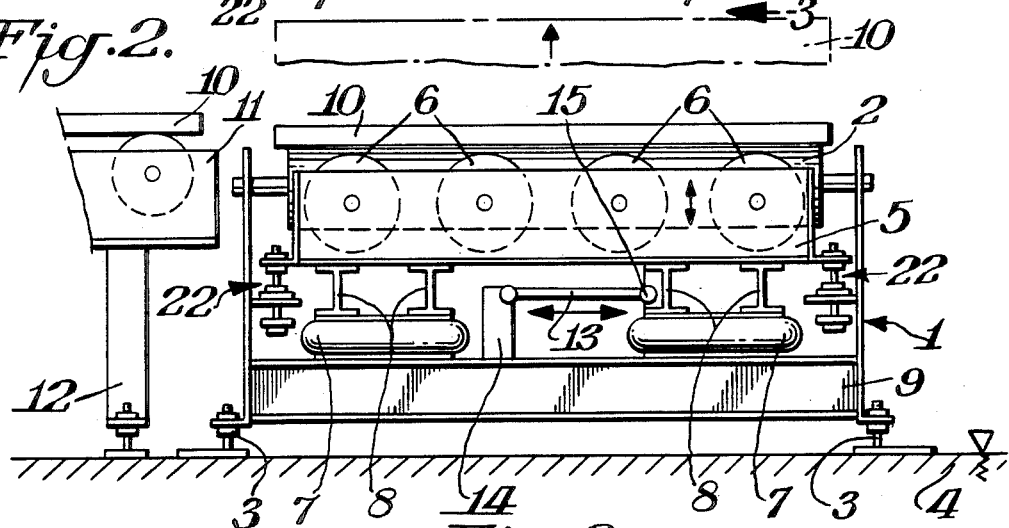
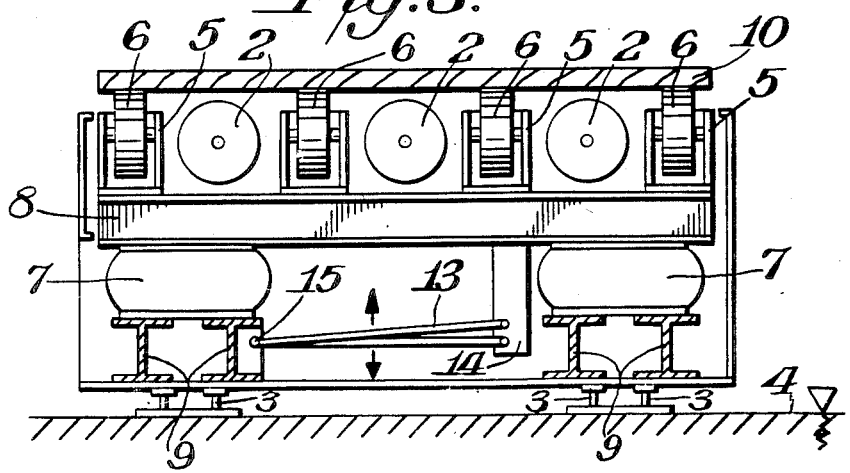

ROLLER DECK LIFTING DEVICE FOR ANGULARLY DEFLECTING TRANSPORT GOODS

BACKGROUND OF THE INVENTION

The present invention relates to a lifting device for a roller deck used to angularly deflect transport goods such as pallets. The roller deck consists of a basic frame and a lift frame which is movable relative to the basic frame. Both frames have support rollers for transporting the pallets.

When conveying pallets in shelved storage areas, it is often necessary to deflect the pallets alone, as well as those loaded with piece goods, by 90° within the tightest amount of space. For this purpose, roller decks are used which are installed at the end of the roller track. The roller deck generally consists of a basic frame, in which, for example, rollers are mounted in the same conveying direction as those of the preceding roller track. A vertically movable lift frame is associated with the basic frame, and the rollers of the lift frame retract between the rollers of the basic frame. The axes of the rollers in the lift frame are at right angle to the axes of the rollers in the basic frame. It is thereby possible to convey a pallet loaded with piece goods in one direction onto the roller deck and subsequently by raising the lift frame, to further convey the pallet in a direction at right angles to the prior direction onto an additional roller track which is mounted at a slight difference in height with respect to the first roller track.

In order to raise and lower such a roller deck, cam drives or hydraulic drives have previously been used with the aid of which a relative motion between the basic frame and the lift frame can be carried out. When cams are used, it is necessary, in case of replacement of the cam, to separate the lift frame in order to dismantle the lifting device itself. Constant maintenance of the installation is required in order to avoid premature wear. When using hydraulic lifting devices and in the case of wear of an individual lifting device, the lift frame and the basic frame must likewise be separated. In order to precisely guide the lifting device, a film anchoring of the device, namely the cylinder, is required in the basic frame as well as in the lift frame. Furthermore, steady maintenance is indispensable and one must work with a certain excess of hydraulic fluid in order to avoid premature wear. This directly results in the dirtying of such a roller deck by hydraulic fluid.

Proceeding from this, the objective of the present invention is to carry out an exchange of worn lift elements without separation of the roller deck into basic and lift frames. At the same time, the lift elements are maintenance-free during operation. By mounting four pneumatically actuated lift bellows between the basic frame and the lift frame, and by installing four stops, raising and/or lowering of the lift frame a predetermined distance is made possible. Instead of the four pneumatically actuated bellows in the corners, between the basic frame and the lift frame, a single lift bellows can be used if it is in the central region between the basic frame and the lift frame and stops are provided at all four corners. By raising the pressure of at least one lift bellow, a significant amount of touching of the lift frame at the end settings of the stops is insured. By using air, no environmental pollution occurs within such a conveyor path since no oil is released into the atmosphere when the lift frame is lowered.

Guides for the path of travel of the lift frame are useful when using four bellows and particularly useful when using a single lift bellows. While particular stop arrangements for the path of travel of the lift frame may also be used to guide the lift frame, a separate guiding system eliminates wear of the stops.

A further development of the subject of the invention, the installation of three guides onto the roller deck is proposed. By means of these three guides, a clear precise guidance of the roller deck is assured during lifting and lowering movements.

By firmly attaching the lift bellows to the basic frame, for installations which are subject to shocks, a secure support of the lift bellows is achieved which is not required with shock-free conveying systems. It is, hereby, sufficient if the support in the basic frame is flat or slightly dish shaped. As a result of this, no additional installation labor, especially upon replacement of left bellows, is required, and a new lift bellows can be introduced between the basic frame and the lift frame in a minimal amount of time without the need for separating the two frames or providing additional support for them. According to the invention, a self-locking of the bellows between the basic frame and the lift frame is attained by maintaining a slight pressure so that the bellows do not quite raise the lift frame without providing additional anchorings on the basic frame or the lift frame. The stops serve, at the same time, as prop-like supports for supporting the lift frame on the basic frame while replacing bellows.

In order to be able to transport a sensitive material with the device according to the invention and to deflect it by 90°, a rubber coating of the stops is proposed. As a result of the inventive coating of the individual stops with rubber or other shock absorbing material such as rubber-like plastic, the collision of the impact of the end locations is so dampened that damage to the partially sensitive goods on the pallets does not occur. Such dampenings are not available with hydraulic drives nor with cam drives.

BRIEF DESCRIPTION OF THE DRAWING

Novel features and advantages of the present invention in addition to those mentioned above will become apparent to those of ordinary skill in the art from a reading of the following detailed description in conjunction with the accompanying drawing wherein similar reference characters refer to similar parts and in which:

FIG. 1 is a top plan view of a roller deck for deflecting goods being transported, according to the present invention;

FIG. 2 is a front elevational view of the roller deck shown in FIG. 1;

FIG. 3 is a sectional view taken along line 3—3 of FIG. 1;

DETAILED DESCRIPTION OF THE INVENTION

Figure 4:
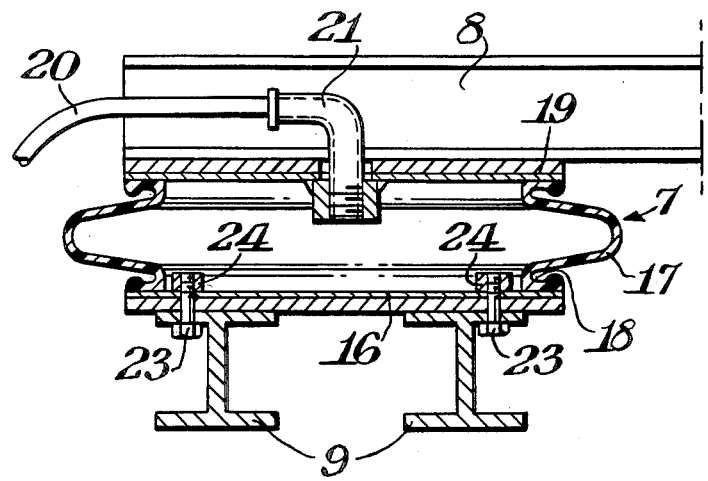
FIG. 4 is an enlarged sectional view of the bellows type lifting device of the roller deck illustrated in FIGS. 1-3.

Referring in more particularity to the drawing, FIGS. 1 and 2 illustrate a roller deck having a basic frame 1 which serves as a mounting frame for at least three rollers 2. The rollers 2 are oriented in one direction and extend over the entire width of the basic frame. The frame rests on a horizontally disposed foundation 4 which in most cases comprises the floor of the building where the machinery is located.

The roller deck also includes a lift frame 5 having rows of short rollers 6 extending between the rollers 2 of the basic frame. The axes of the shorter rollers 6 are at right angle to the axes of the rollers 2. Pneumatically actuated lift bellows 7 are installed between the basic frame 1 and carriers 8 interconnecting the lift frame 5. Compressed air introduced into the lift bellows 7 functions to elevate the carriers 8 and lift frame 5. As shown in FIGS. 1-3, the carriers 8 form the undercarriage of the lift frame. In the same manner, additional carriers 9 form the under carriage of the basic frame 1.

By lifting the short rollers 6, they are raised above the level of the rollers 2 and thus take over a pallet 10 transported on the rollers 2 so that it can be transported away, possibly with goods via a roller track 11. The roller track 11 runs at right angles to the previous roller track direction which was determined by the rollers 2. The roller track 11 is aligned by means of stands 12 upwardly extending from the foundation 4.

In order to permit guiding movement of the lift frame 5, guides 13 are provided which are mounted on the one hand in a jointed manner onto consoles 14 at the additional carriers 9, and on the other the guides 13 also rest in jointed fashion on the carriers 8 in a support 15. As best shown in FIGS. 2 and 3, the guide 13 extends, in the case of a half raised lift frame 5, in a straight line halfway between the carriers 8 and the additional carriers 9. A symmetrical guidance of the lift frame between the lowered position and the extended position is thus achieved. Also, FIGS. 1 and 2 show that the length of the guides 13 is quite great when compared to the lifting movement of the lift frame. For example, the magnitude of the lifting movement may be about 30 mm while the length of the guides is about 2 meters.

The roller deck includes two longitudinal sides (FIG. 3) and two lateral sides (FIG. 2). The guides 13 are arranged so that one guide is positioned on each longitudinal side and also on one of the lateral sides. All of the guides interconnect the basic and lift frames and each guide is in generally horizontally position to stabilize and guide the lift frame as it is moved relative to the basic frame. Also, as explained above, guides for the path of travel of the lift frame are useful when using four individual bellows and particularly useful when using a single lift bellows. Corner stop arrangements described more particularly below also function to guide the path of travel of the lift frame. However, the separate guides 13 operate to eliminate wear of the stops.

By mounting the lift bellows 7 at the four corners of the deck between the additional carriers 9 and the carriers 8, it is possible to use lift bellows with less pneumatic power as opposed to using a single lift bellows. Filling and emptying of the lift bellows is done with compressed air so no leakage of oil will happen. Hence, there is no pollution due to environment damaging oil, even with numerous actuations of the lifting mechanism.

A lift bellows 7 is shown in an enlarged scale in FIG. 4. The lift bellows 7 is supported on the additional carriers 9 by means of a plate 16. The elastic part 17 of the lift bellows 7 is, for example, attached to plate 16 by means of threaded fasteners 18. An air tight connection between the plate 16 and the elastic part 17 is thus produced.

A metallic cover 19 is tightly connected to the other side of the elastic part 17 of the lift bellows 7. This may also be accomplished with threaded fasteners such as 18. The metallic cover 19 rests on the carriers 8 of the lift frame 5. When compressed air is brought into the inner chamber of the bellows 7 via a line 20 and a elbow 21, the bellows expands upward in the direction of the arrow. Such action raises the lift frame 5 including the rollers 6 until a stop 29 ends the lifting motion. A certain overdose of compressed air is introduced into the inner chamber of the lift bellows 7 via the line 20 for the purpose of obtaining a certain contract pressure against the stop 29 of the overall stop arrangement 22.

After the pallet 10 is transported away, the air enclosed in each lift bellows 7 may be released into the atmosphere by opening a valve. In order to avoid noise pollution due to outflowing gas, the line 20 may be used as a suction line for a vacuum pump (not shown). The use of suction eliminates the noise caused by an otherwise outflowing gas.

As previously mentioned, the certain base pressure in the bellows functions to tightly wedge the bellows between the carriers 8 and the additional carriers 9. Under normal lifting conditions, a shift of the lift bellows cannot occur. If for safety reasons, a screw connection 23 is provided, then a thread bearer 24 in the form of a cap screw is securely welded to plate 16, inside the lift bellows 7. In this way, it is assured that gas cannot leak out at this location during lifting.

Figure 5:
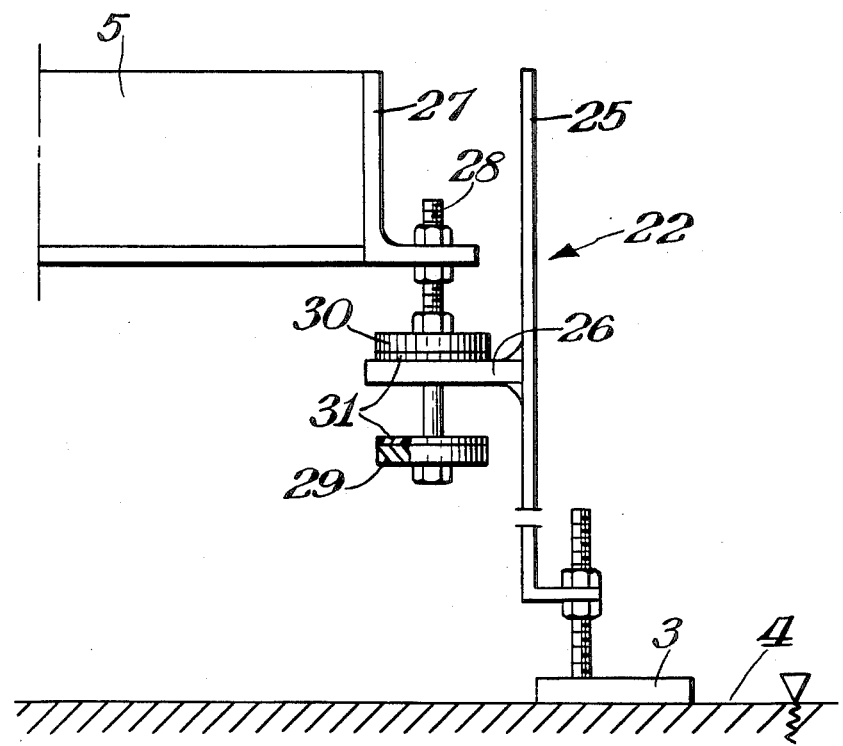
FIG. 5 is an enlarged view illustrating the stop mechanisms of the roller deck shown in FIGS. 1-3.

The stop arrangement 22 shown in FIG. 2 is also shown in enlarged detail in FIG. 5. At each of the four corners, a limiting tongue 26 is mounted onto an angle plate 25. The angle plate is supported by the foundation 4 and by the additional carriers 9 and is, for example, welded or bolted onto these carriers. A bracket 27 is mounted onto the lift frame 5 and a threaded stud 28 is carried by the bracket. The threaded stud 28 is vertically oriented and firmly attached to the bracket 27 by means of internally threaded nuts on opposite sides of the bracket. The threaded stud carries an adjustable upper stop 29 for stopping the upward lift and a lower stop 30 for limiting the low position of the lift frame.

When the upper limit stop 29 engages the limiting tongue 26, the lift motion is brought to a standstill at a precisely defined height so that a 90° shift of the pallet can be carried out through utilization of rollers 2. The lower stop 30 also assists the lift bellows in supporting the lift frame. If the lift bellows were the only support for the lift frame, a simple replacement of one or more of the lift bellows would not be possible without additional support structures between the carriers 8 and the additional carriers 9. With the present inventive arrangement, the lower stop 30 together with the limiting tongue 26 takes up the support function when a bellows is replaced. As previously explained, bellows are mounted at the four corners of such a roller track which consists of liftable rollers 2 and short rollers 6 at right angle to one another.

As shown best in FIG. 5, the surfaces of the lower and upper stops which contact the limiting tongue are provided with a rubber or rubber-like plastic layer 31 in order to produce a dampening effect during the lifting and lowering steps of the lift frame.

We claim:

1. A lifting device for a roller deck that changes the direction of travel of goods being transported, the roller deck having two longitudinal sides and two lateral sides and comprising a basic frame and a generally rectangular shaped lift frame mounted for movement relative to the basic frame, first rollers for transporting the goods in one direction journaled to the basic frame and second rollers for transporting the goods in another direction journaled to the generally rectangular shaped lift frame, pneumatically actuated lift bellows means mounted between the basic frame and the movable lift frame, means actuating the bellows to thereby elevate the rollers of the lift frame above the rollers of the basic frame and deactivating the bellows to lower the lift frame, and a stop arrangement mounted between the lift frame and the basic frame for limiting movement of the lift frame relative to the basic frame, the stop arrangement including upper and lower stop elements connected to the lift frame at each corner of the roller deck and a stationary tongue connected to the basic frame and disposed between each of the upper and lower stop elements for limited relative movement between the basic and lift frames and for supporting the lift frame by engaging the upper stop element.

2. A lifting device for a roller deck that changes the direction of travel of goods being transported, the roller deck having two longitudinal sides and two lateral sides and comprising a basic frame and a generally rectangular shaped lift frame mounted for movement relative to the basic frame, first rollers for transporting the goods in one direction journaled to the basic frame and second rollers for transporting the goods in another direction journaled to the generally rectangular shaped lift frame, pneumatically actuated lift bellows means mounted between the basic frame and the movable lift frame, means actuating the bellows to thereby elevate the rollers of the lift frame above the rollers of the basic frame and deactivating the bellows to lower the lift frame, and a stop arrangement mounted between the lift frame and the basic frame for limiting movement of the lift frame relative to the basic frame, the stop arrangement including an individual stop element at each corner of the roller deck interconnecting the basic and lift frames while allowing limited relative movement therebetween in a vertical direction, and wherein the pneumatically activated lift bellows means includes four individual bellows, one at each corner of the roller deck between the basic frame and the lift frame.

3. A lifting device as in claim 2 including guide means interconnected between the basic frame and the lift frame extending in a generally horizontal direction for guiding vertical movement of the lift frame relative to the basic frame when the bellows are activated and deactivated.

4. A lifting device as in claim 3 wherein the guide means is positioned on each longitudinal side and on one lateral side.

5. A lifting device as in claim 2 wherein each lift bellow is anchored to the basic frame.

6. A lift device as in claim 4 wherein each guide means comprises an elongate member the length of which is significantly longer than the amount of vertical movement of the lift frame.

7. A lifting device as in claim 2 wherein the stop arrangement includes dampening means.

* * * * *